B. E. BRAUCHT.
DEMOUNTABLE RIM FOR VEHICLE WHEELS.
APPLICATION FILED APR. 11, 1917.
1,293,015.
Patented Feb. 4, 1919.
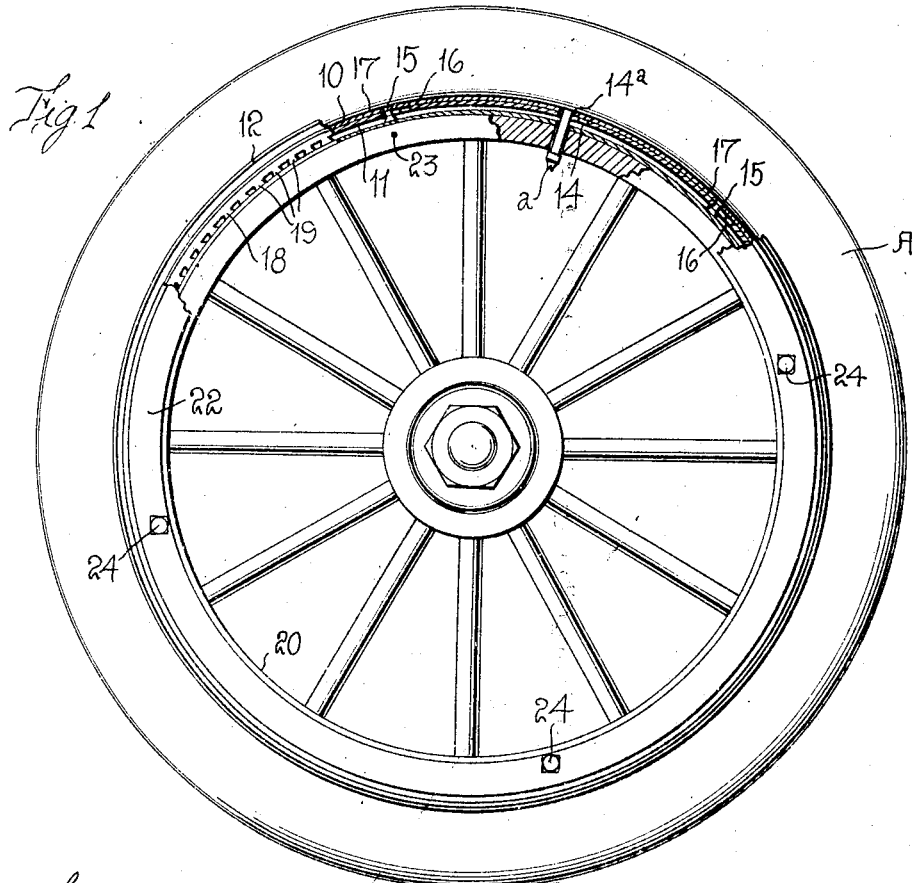
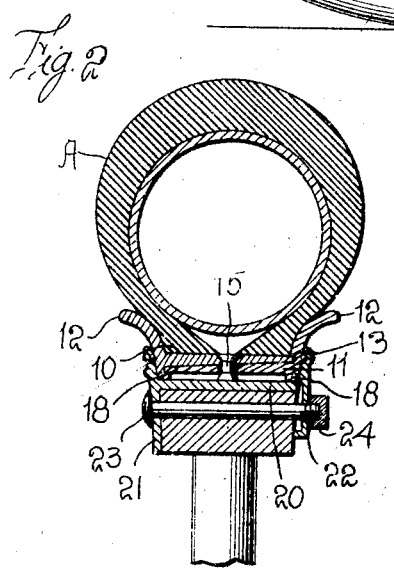
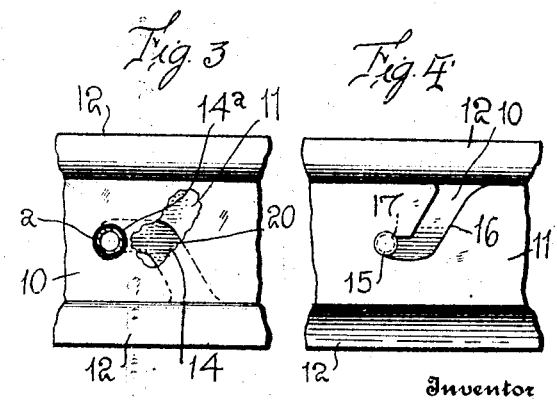
Inventor
B. E. BRAUCHT
By Watson E. Coleman
Attorney

UNITED STATES PATENT OFFICE.

BENJAMIN E. BRAUCHT, OF CARTWRIGHT, NORTH DAKOTA.

DEMOUNTABLE RIM FOR VEHICLE-WHEELS.

1,293,015.  Specification of Letters Patent.  Patented Feb. 4, 1919.

Application filed April 11, 1917. Serial No. 161,279.

*To all whom it may concern:*

Be it known that I, BENJAMIN E. BRAUCHT, a citizen of the United States, residing at Cartwright, in the county of McKenzie and State of North Dakota, have invented certain new and useful Improvements in Demountable Rims for Vehicle-Wheels, of which the following is a specification, reference being had to the accompanying drawings.

This invention relates to wheel rims, and particularly to the demountable rims used on automobiles.

The general object of my invention is to provide a very simply constructed and easily applied demountable rim, comprising two sections, each having a side flange, the sections having telescopic and interlocking engagement with each other.

A further object is to provide a demountable rim comprising two sections having telescopic engagement with each other, in which the interlocking of the two sections is secured by a limited rotation of the sections, one upon the other.

A further object is to provide for a perfectly flat support for the tire extending entirely across the outer face of the rim, so that there will be no joint beneath the tire and so that the beading of the tire may rest upon a solid, flat face.

A further object is to do away with the use of a demountable rim made in two sections hinged to each other, which construction is objectionable because the inner tubes are often pinched by the hinge.

A further object is to provide a demountable rim construction which will not be easily battered or sprung out of shape and in which the tire will go on without twisting and prying thus lengthening the life of the tire.

A further object is to provide means on the sections whereby they may be easily rotated by each other to thus interlock the sections with each other.

Other objects will appear in the course of the following description.

My invention is illustrated in the accompanying drawings, wherein:—

Figure 1 is an elevation of a vehicle wheel with my demountable rim applied thereto, the rim being partly in section;

Fig. 2 is a radial section through the felly of the wheel, the demountable rim and the tire;

Fig. 3 is a fragmentary face view of the demountable rim;

Fig. 4 is a face view of the rim looking from the inside.

Referring to these drawings, it will be seen that the demountable rim comprises two sections, an outer section 10 and an inner section 11. Both of these sections are annular in form and each section is formed with an outwardly flared flange 12. As illustrated in Fig. 2 the under face of the section 10 is beveled from the flange 12 to the edge of the section, while the section 11 has its upper face beveled, these beveled faces confronting each other when the sections are in proper engagement. Preferably the section 11, at the junction of the section with the corresponding flange 12, is formed with an annular groove 13, into which the edge of the section 10 extends, when the sections are being placed in operative engagement with each other and before the sections are locked, as shown in Fig. 2. The section 11 is formed with a bayonet slot 14, through which the air valve $a$ of the tire A is adapted to pass, and the section 10 is also formed with a like opening $14^a$ which is adapted to aline with the slot 14. The section 10 is provided at a plurality of points with a series of inwardly projecting studs 15, which are preferably, though not necessarily, headed, and the section 11 is formed with a plurality of bayonet slots 16, these slots having the specific form shown in Fig. 4, that is the front and rear walls of each slot extend inward at an angle to the circumference of the rim or section, then extend longitudinally and the slot terminates in a notch 17. The bayonet slots 16 are to be about 5 or 6 inches apart and they are sufficiently long to permit of a rotative movement of one section upon the other section of about three inches. The first two inches of each bayonet slot is constructed so as to cause the rims to be tightly drawn toward each other and together, this being accomplished by the beveled or inclined front and rear walls of the slot 16 and the remainder of the length of the slot allows the studs to move forward and slip into the notches 17, which locks the rim sections together. It will be obvious, of course, that the bayonet slot 14, which is practically the same as the other slots, accommodates the air valve of the tire. After the studs 15 slip into the notches 17, the edge of the section 10 is withdrawn from full engagement with the groove 13, but by providing this groove 13, I prevent the section 10 from moving away from the flange 12 to an extent which would leave an annular recess between the edge of the section 10 and the adjacent face of the flange 13, into which recess the tire or shoe might be crowded and become pinched, and thus secure a flat supporting base for the tire across its entire extent. By providing the notches 17 at the ends of the bayonet slots 16, the air pressure within the casing A will cause the rim to securely lock, the rim sections being so securely locked together that they can be carried or handled without a possible chance of the air pressure spreading the rim sections and without any chance of one rim section moving longitudinally upon the other rim section, which would damage the tire casing and possibly endanger human life.

Preferably each section 10 and 11 is formed on its outer margin with an inwardly extending flange 18, which is cogged or notched as at 19. The teeth or cogs thus formed are wedge-like in character.

While I do not wish to limit myself to any particular form of wheel, or any particular manner of holding the demountable rim upon the wheel, I have illustrated an ordinary form of wheel in which the rim 20 is provided with a flange 21 on one side and with a detachable flange or locking ring 22 on the opposite side. This locking ring is held in place by studs 23, which extend out from the side of the rim, or which may be in the form of bolts, these studs being disposed at uniform distances and being screw-threaded for engagement with nuts 24. These are preferably cap nuts, so that they may be turned up by the ordinary brace wrench. It is obvious that when the locking ring 22 is in place, the demountable rim will be held firmly upon the wheel. When in place upon the wheel, the demountable rim rests on the wheel rim, as shown in Fig. 2, that is, the studs 15 and the lateral toothed flanges 18 rest upon the periphery of the wheel rim.

This demountable rim may be readily applied to the tire in the following manner. The section 10 is laid down and the valve stem or tire slipped through the opening 14. The other section 11 is now laid flat down on the section 10 with the notches in the section 11 in coincidence with the studs on the rim 10. A screw driver or straight piece of steel is now disposed in engagement with the wedge-like teeth 19 and the sections are pried sidewise, so as to engage the notches of the section 11 with the studs on the section 10. While this prying action is being proceeded with, the section 11 is tapped lightly with a hammer so that the section 11 will slip into the section 10. The inclined walls of the slots 16 will cause the rim sections to be drawn into free engagement with each other, and then after they are in engagement, one section is rotated relative to the other so as to interlock the sections with each other in the manner described. The rim with the tire is now adapted to be disposed on the wheel in the usual manner and held thereto by the locking ring 22.

As before remarked the section 10 extends entirely across and forms the bottom of the demountable rim and fits firmly in a notch in the side flange of the other section and thus the lateral beads of the tire or shoe rest firmly on a solid flat rim. Both sections are to be circular and it will be seen that by doing away with a hinged joint in the demountable rim, I obviate the danger of pinching the inner tubes, which was incident to certain prior constructions of this character. Furthermore, it will be seen that the rim sections may be made very strong, so that they will not be easily battered or sprung out of shape. It will be seen that the air pressure in the tire will lock the rims tightly together. While I have illustrated the preferred form of my invention, I wish it understood that this form may be modified in many minor respects, without departing from the spirit of the invention.

In order to prevent the demountable rim from shifting longitudinally relative to the wheel rim, I may provide a projection on the demountable rim which will engage with a recess on the wheel rim, or vice versa, and I have illustrated the members 10 and 11 as being provided with projections 25 engaging in recesses in the lateral flanges of the wheel rim to prevent longitudinal movement of the demountable rim which would tend to shear the valve stem $a$. Any suitable means may be provided for this purpose. This demountable rim is so simple that it will be particularly easy to put on and take off the wheel so that even women can remove and replace this demountable rim.

Having described my invention, what I claim is:—

A demountable rim for tires comprising two annular sections, one smaller in diameter than the other and fitting inside the other, each of said sections being formed with an outer flange, the flange of the inner section having a circumferentially extending groove at its junction with the main body of the section into which the edge of the body of the other section is adapted to engage when the sections are being put together, one of said sections having a plurality of studs and the other section having a plurality of bayonet slots into which said studs are adapted to engage, each bayonet slot having inclined entrance walls, a longitudinally extending portion, and a notch in the longitudinally extending portion extending in a direction away from said groove, said groove having a depth slightly greater than the depth of the notch whereby the outer rim section may extend into said groove at all engaged positions of the rim sections with each other, to thereby cause the outer rim section to fill the space between the flanges of the rim, as and for the purpose described.

In testimony whereof I hereunto affix my signature in the presence of two witnesses.

BENJAMIN E. BRAUCHT.

Witnesses:
W. J. McGlynn,
Lucy E. Barnes.